United States Patent
Mansbridge

(10) Patent No.: US 6,842,497 B1
(45) Date of Patent: Jan. 11, 2005

(54) DATA FILTERING APPARATUS AND METHOD OF FILTERING A PLURALITY OF DATA SIGNALS

(75) Inventor: John Mansbridge, Eastleigh (GB)

(73) Assignee: Roke Manor Research Limited, Hampshire (GB)

( * ) Notice: Subject to any disclaimer, the term of this patent is extended or adjusted under 35 U.S.C. 154(b) by 0 days.

(21) Appl. No.: 09/494,053

(22) Filed: Jan. 28, 2000

(30) Foreign Application Priority Data

Jan. 28, 1999 (GB) .............................................. 9901900

(51) Int. Cl.[7] .............................. H04B 1/10; H04B 10/06
(52) U.S. Cl. ....................... 375/350; 375/349; 398/202; 398/208
(58) Field of Search ................................ 375/259, 341, 375/260, 286, 287, 317, 340, 349, 350, 267, 284, 285, 316; 359/110, 118; 364/200; 455/608; 370/398, 381, 351; 356/28.5; 398/138, 285, 305, 45, 103, 115, 117, 202, 208

(56) References Cited

U.S. PATENT DOCUMENTS

| | | | | |
|---|---|---|---|---|
| 4,063,226 A | * | 12/1977 | Kozma et al. ............... | 365/125 |
| 4,118,701 A | * | 10/1978 | Fletcher et al. ............. | 342/200 |
| 4,409,652 A | * | 10/1983 | Neumann et al. ........... | 364/200 |
| 4,479,266 A | * | 10/1984 | Eumurian et al. .......... | 455/608 |
| 4,636,718 A | * | 1/1987 | Labrum et al. .......... | 324/76.37 |
| 4,825,451 A | * | 4/1989 | Schwartz ..................... | 375/27 |
| 5,138,475 A | * | 8/1992 | Bergmann et al. .......... | 359/118 |
| 5,214,527 A | * | 5/1993 | Chang et al. ............... | 398/202 |
| 5,790,286 A | * | 8/1998 | Bae ............................. | 359/110 |
| 6,188,734 B1 | * | 2/2001 | Tazaki et al. ............... | 375/341 |
| 6,480,445 B1 | * | 11/2002 | Yun et al. ................. | 369/44.32 |

* cited by examiner

Primary Examiner—Young T. Tse
Assistant Examiner—Sam K. Ahn
(74) Attorney, Agent, or Firm—Martin Fleit; Paul D. Bianco; Fleit Kain Gibbons Gutman Bongini & Bianco P.L.

(57) ABSTRACT

In the field of Acousto-Optic processors, it is desirable to sample and multiplex a large quantity of time varying data generated by a photodiode array. However, current multiplexers cannot sample at a high enough rate in order to process all of the data generated in real time, resulting in a reduced sampling bandwidth and therefore a loss of information. A data filtering apparatus and method of filtering a plurality of data signals overcomes this problem by providing a channel selection logic unit which instructs a multiplexer to only sample data generated which is above a predetermined threshold value, thereby omitting to sample data which is of little information value.

12 Claims, 4 Drawing Sheets

DATA FILTERING APPARATUS AND METHOD OF FILTERING A PLURALITY OF DATA SIGNALS

BACKGROUND OF THE INVENTION

1. Field of the Invention

The present invention relates to an information filtering apparatus, for example, of the type used with multiplexing units coupled to a sources of a plurality of data signals, such as a photodiode array. The present invention also relates to a method of filtering the plurality of data signals received.

2. Prior Art

In the field of Acousto-Optic (AO) processors, it is known to optically process an electronic signal, having a bandwidth B, using a Bragg cell disposed between a so collimated light source and a lens, the lens being arranged to perform a Fourier transform on light propagating from the Bragg cell. Generally speaking, the spatial distribution of light at the focus of the lens (hereinafter referred to as the 'Fourier distribution') is the Fourier transform of the spatial distribution of the light at the aperture let of the lens. The Fourier distribution at the focus of the lens is detected by an array of photodetectors. The electronic signal is therefore converted into N frequency channels, where N is the number of photodetectors in the array of photodetectors, each frequency channel having a nominal bandwidth of B/N. Additionally, the Bragg cell can be modulated in order to produce a varying Fourier distribution at the array of photodetectors.

The array of photodetectors is typically packaged as an integrated circuit comprising a line of, for example, 1000 photo-lithographically produced photodetector elements. Thus, if the bandwidth B of the electronic signal is 1 GHz, the signal generated by each photodetector element has a bandwidth of 1 MHz (1 GHz/1000). The number of photodetector elements is usuall possessed by the integrated circuit, thereby necessitating the provision of a multiplexer in the same package as the array of photodetectors. The multiplexer samples each photodetector element and transfers the voltage/charge on the photodetector element to an output buffer coupled to other electronic circuitry via the pins.

Currently available multiplexers will take around 100 $\mu$s to scan all the photodetector elements (1000), which implies an output bandwidth of 5 kHz for each photodetector element; this is much less than the bandwidth of 1 MHz of the signals generated by the photodetector elements. Therefore, it can be seen that a great deal of information is received by each photodetector element is being lost. Furthermore, in some applications information relating to only a small number of frequencies in the bandwidth of the electronic signal may be required. Thus, processing information relating to frequencies, other than those required, is a waste of multiplexer resources.

SUMMARY OF THE INVENTION

It is therefore an object of the present invention to obviate or at least mitigate the above described problems associated with AO processors.

According to the present invention, there is provided a data filtering apparatus for a multiplexing unit arranged to receive a plurality of data signals, the apparatus comprising input means for receiving the plurality of data signals, processing means arranged to identify at least one data signal from the plurality of data signals conforming to a predetermined criteria and transmit an identifying signal corresponding to the identified at least one data signal to the multiplexing unit for selective processing of the at least one data signal from the plurality of data signals.

It is thus possible to provide filtering data apparatus capable of enabling the multiplexing unit to sample data signals at the full bandwidth of the data signals.

Preferably, the processing means comprises level detection means, for example, an array of comparator means arranged to determine whether each of the plurality of data signals is above a predetermined threshold.

Additionally, the processing means can include means for receiving an external control signal, for example, an instruction relating to the selective processing of the plurality of data signals.

The data filtering apparatus can form part of a photodiode array processing unit, for example, a Acousto-Optic processor comprising the data filtering apparatus as claimed in any one of the preceding claims.

In a preferred embodiment of the invention, the data filtering apparatus may be a channel selection logic unit for a multiplexing unit. The logic unit may comprise an input port for receiving receive a plurality of data signals, a processing unit including a plurality of level detectors coupled to the input port and arranged to determine whether each of the plurality of data signals is above a predetermined threshold, and generate an identifying signal indicative of each of the plurality of data signals being above the predetermined threshold, and an output port for coupling to the multiplexing unit in order to transmit the identified at least one data signal to the multiplexing unit for selective processing of the at least one data signal from the plurality of data signals.

According to the present invention, there is also provided a method of filtering a plurality of data signals for a multiplexing unit, the method comprising the steps of: receiving the plurality of data signals, identifying at least one data signal from the plurality of data signals conforming to a predetermined criteria, and transmitting an identifying signal corresponding to the identified at least one data signal to the multiplexing unit for selective processing of the at least one data signal from the plurality of data signals.

Preferably, the method further comprises identifying the at least one data signal from the plurality of data signals conforming to the predetermined criteria by determining whether each of the plurality of data signals is above a predetermined threshold.

BRIEF DESCRIPTION OF THE DRAWINGS

At least one embodiment of the invention will now be described, by way of example, with reference to the accompanying drawings, in which.

Throughout the description identical reference numerals shall be used to identify like parts of the apparatus.

DETAILED DESCRIPTION OF PREFERRED EMBODIMENT

Figure 1:
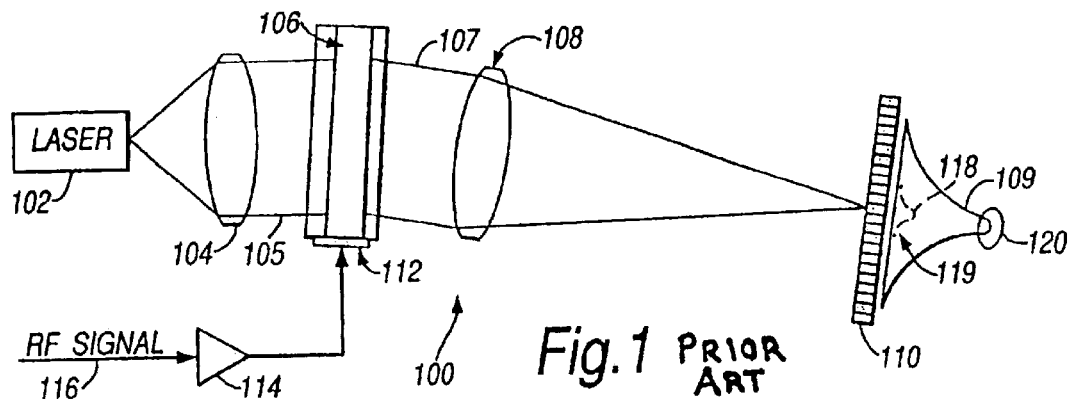
FIG. 1 is a schematic diagram of a known AO processor arrangement.

An AO processor 100 comprises a coherent light source, for example, a laser 102, a Bragg cell 106, and a first lens 104 positioned between the Bragg cell 106 and the laser 102. A second lens 108 is located in the optical path of the Bragg cell 106 in order to Fourier transform and focus light onto a photodetector unit 110.

A transducer 112 is coupled to the Bragg cell 106 in order to convert electrical energy to acoustic energy. The electrical energy is provided by a power amplifier 114 having an input terminal (not shown) for receiving a Radio Frequency (RF) input signal 116.

Figure 2:
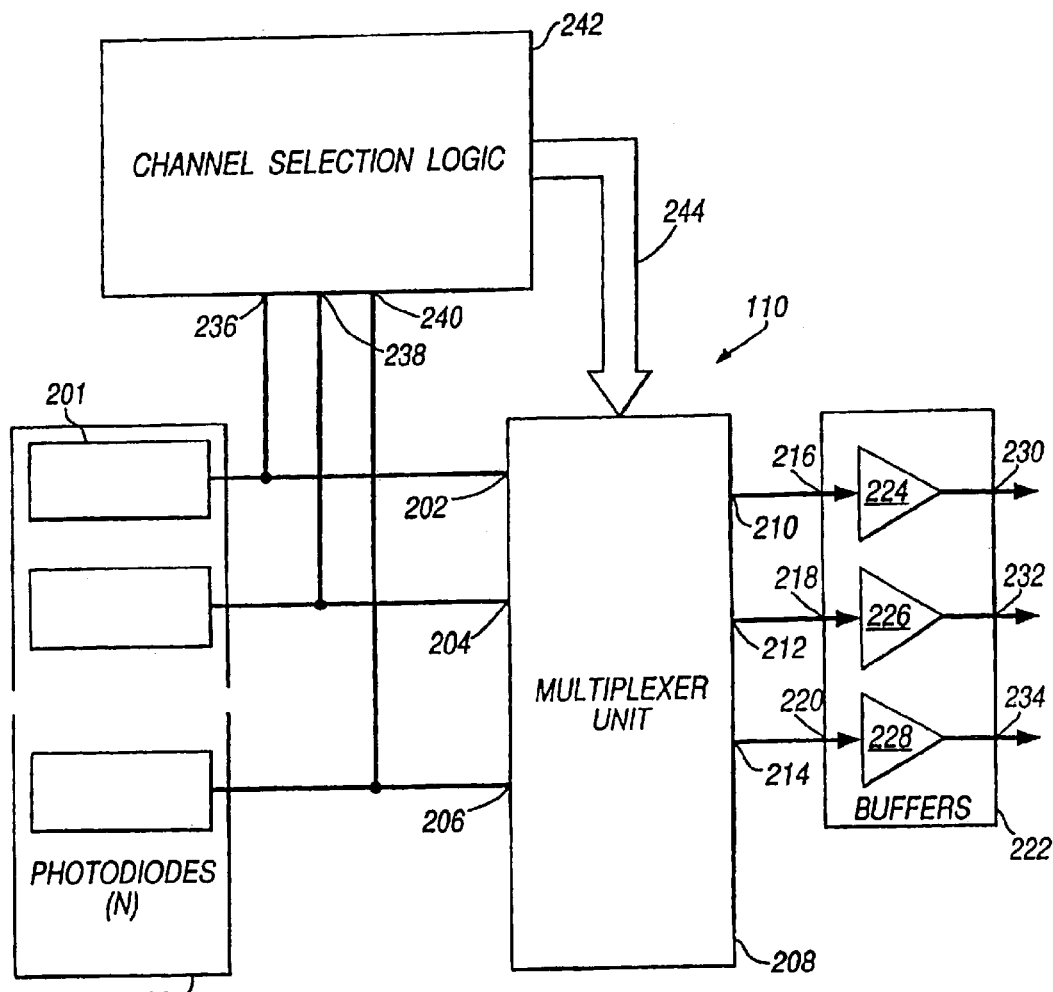
FIG. 2 is a schematic diagram of an apparatus constituting an embodiment of the invention.

The photodetector unit 110 (FIG. 2) comprises a plurality of photodetector elements, for example, 1000 photolithographically produced photodiodes disposed on an integrated circuit as a linear photodiode array 200. Each photodiode of the photodiode array 200 is typically 10 $\mu$ wide. Although in this example, the integrated circuit comprises 1000 photodiodes, the integrated circuit can comprise a fewer or greater number of photodetector elements, not limited to photodiodes.

Each photodiode of the photodiode array 200 is coupled respectively to a first, second and $N^{th}$ input terminal 202, 204, 206 of a multiplexer unit 208, the multiplexer unit 208 having a first, second and $M^{th}$ output terminal 210, 212, 214 (for example, more than six) coupled to a respective first, second and $M^{th}$ input terminal 216, 218, 220 of an output buffer unit 222. The output buffer unit 222 comprises a first, second and $M^{th}$ buffer 224, 226, 228, each respectively coupled to the first, second and $M^{th}$ input terminals 216, 218, 220; the first, second and $M^{th}$ output buffers 224, 226, 228 have a respective first, second and $M^{th}$ output terminal 230, 232, 234.

Each photodiode of the photodiode array 200 is also coupled to a respective first, second and $N^{th}$ input terminal 236, 238, 240 of a channel selection unit 242, the channel selection unit 242 being coupled to the multiplexer unit 208 by an output data bus 244.

Figure 3:
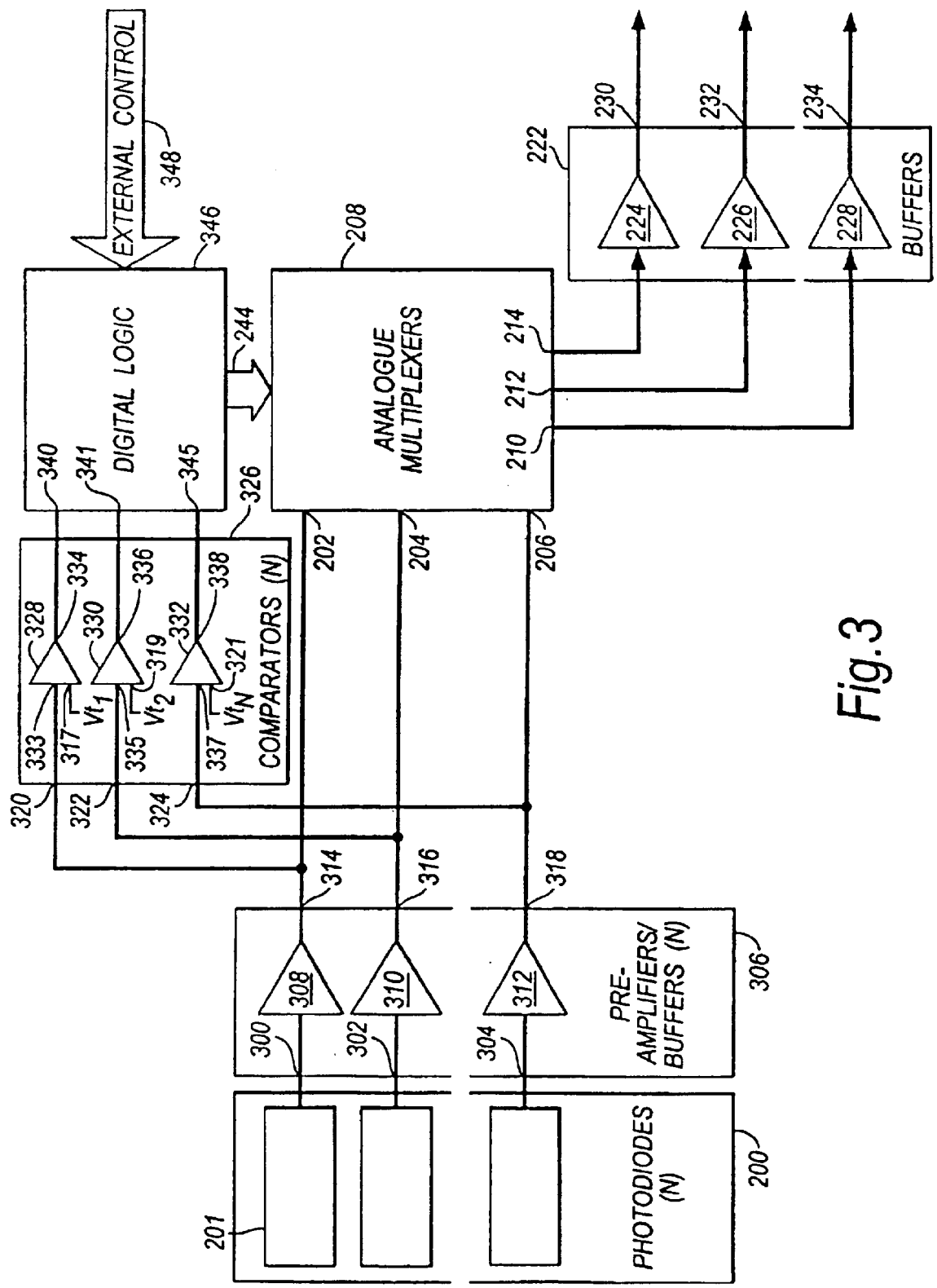
FIG. 3 is a schematic diagram of the apparatus of FIG. 2 in more detail.

Referring to FIG. 3, a more detailed example of the above described embodiment is disclosed. The first, second and $N^{th}$ input terminals 236, 238, 240 of the channel selection unit 242 are coupled to a respective first, second and $N^{th}$ input terminal 300, 302, 304 of an input-stage buffer unit 306 comprising a first, second and $N^{th}$ pre-amplifier or input buffer 308, 310, 312. The first, second and $N^{th}$ input buffers 308, 310, 312 have a respective first, second and $N^{th}$ output terminal 314, 316, 318 coupled to the first, second and $N^{th}$ input terminals 202, 204, 206 of the multiplexer unit, for example, an analog multiplexer 208. The first, second and $N^{th}$ output terminals 314, 316, 318 are also coupled to a respective first, second and $N^{th}$ input terminal 320, 322, 324 of a comparator unit 326, the comparator unit 326 comprising a first, second and $N^{th}$ comparator 328, 330, 332 having a respective first, second and $N^{th}$ inverting input terminal 333, 335, 337 and a first, second and $N^{th}$ non-inverting input terminal 317, 319, 321. The first, second and $N^{th}$ inverting input terminals 333, 335, 337 are respectively coupled to the first, second and $N^{th}$ input terminals 320, 322, 324. The first, second and $N^{th}$ inverting terminals 317, 319, 321 are respectively coupled to a first, second and $N^{th}$ threshold voltage source (not shown) $V_{t1}$, $V_{t2}$, $V_{tN}$. A first second and $N^{th}$ output terminal 334, 336, 338 of the first, second and $N^{th}$ comparator 328, 330, 332 are coupled to a corresponding first, second and $N^{th}$ input terminal 340, 341, 345 of a digital logic unit 346, the digital logic unit 346 having an external control bus 348. The digital control unit 346 is coupled to the analogue multiplexer 208 via the output data bus 244. The analogue multiplexer 208 is coupled to the buffer unit 222 in the manner already described above.

Although, previously, the above example has been described in relation to N channels, for the purposes of clarity of description, the digital logic unit 346 will now be described in relation to the six input terminals 340, 341, 342, 343, 344, 345. However, it should be appreciated that the circuit described hereinbelow can be appropriately modified by a skilled person according to the value of N, i.e. the number of channels.

Figure 4:
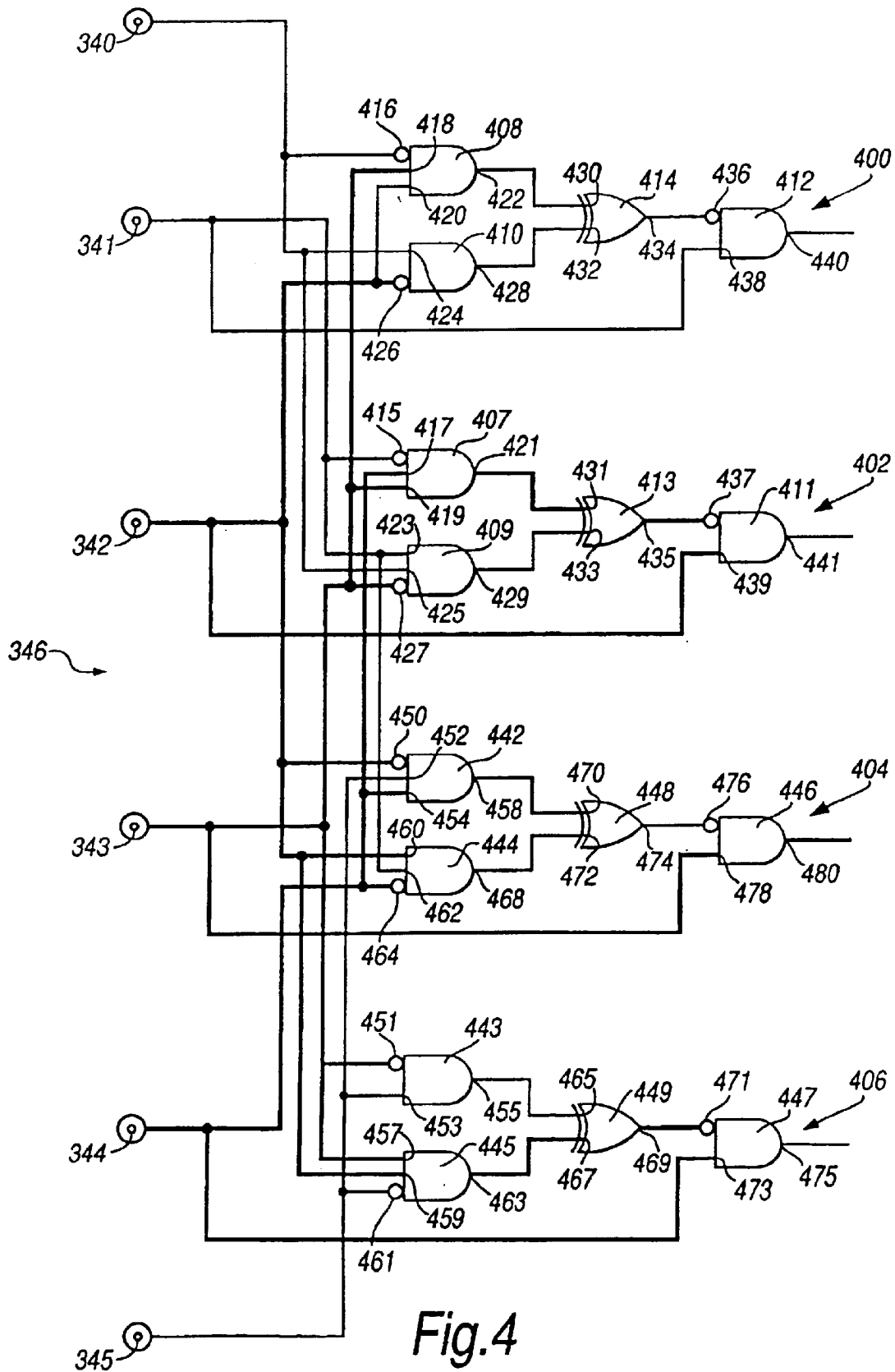
FIG. 4 is a schematic diagram of a logic unit shown in FIG. 3.

The digital logic unit 346 (FIG. 4) comprises a first gate circuit 400, a second gate circuit 402, a third gate circuit 404, and a fourth gate circuit 406. The first gate circuit 400 comprises a first AND gate 408 having a first, inverting, input terminal 416, a second, non-inverting, input terminal 418, a third, non-inverting input terminal 420, and a first output terminal 422 connected to a first input terminal 430 of a first exclusive-OR gate 414. A second input terminal 432 of the exclusive-OR gate 414 is connected to an output terminal 428 of a second AND gate 410 having a first, non-inverting, input terminal 424 and a second, inverting, input terminal 426. The exclusive-OR gate 414 has an output terminal 434 connected to a first, inverting, input terminal 436 of a third AND gate 412, the third AND gate 412 having a second, non-inverting, input terminal 438 coupled to the second input terminal 341 of the digital logic unit 346. An output terminal 440 of the third AND gate 412 is coupled to the output data bus 244 according to any known method in the art.

The second gate circuit 402 comprises a first AND gate 407 having a first, inverting, input terminal 415, a second, non-inverting, input terminal 417, a third, non-inverting, input terminal 419, and an output terminal 421, the output terminal 421 being connected to a first input terminal 431 of an exclusive-OR gate 413 having a second input terminal 433 connected to an output terminal 429 of a second AND gate 409. The second AND gate 409 has a first, non-inverting, input terminal 423, a second, non-inverting, input terminal 425, and a third, inverting, input terminal 427. An output terminal 435 of the exclusive-OR gate 413 is connected to a first, inverting, input terminal 437 of a third AND gate 411 having a second, non-inverting, input terminal 439 connected to the third input terminal 342 of the digital logic unit 436, and an output terminal 441 coupled to the output data bus 244 according to any known method in the art.

The third gate circuit 404 comprises a first AND gate 442 having a first, inverting, input terminal 450, a second, non-inverting, input terminal 452, a third, non-inverting, input terminal 454 and an output terminal 458, the output terminal 458 being connected to a first input terminal 470 of an exclusive-OR gate 448. A second input terminal 472 of the exclusive-OR gate 448 is connected to an output terminal 468 of a second AND gate 444 having a first, non-inverting, input terminal 460, a second, non-inverting, input terminal 462 and a third, inverting, input terminal 464. An output terminal 474 of the exclusive-OR gate 448 is connected to a first, inverting, input terminal 476 of a third AND gate 446 having a second, non-inverting, input terminal 478 connected to the fourth input terminal 343 of the digital logic unit 346. An output terminal 480 of the third AND gate 446 is coupled to the output data bus 244 according to any known method in the art.

The fourth gate circuit 406 comprises a first AND gate 443 having a first, inverting, input terminal 451, a second, non-inverting, input terminal 453 and an output terminal 455, the output terminal 455 being connected to a first input terminal 465 of an exclusive-OR gate 449. A second input terminal 467 of the exclusive-OR gate 449 is connected to an output terminal 463 of a second AND gate 445 having a first, non-inverting, input terminal 457, a second, non-inverting, input terminal 459 and a third, inverting, input terminal 461. An output terminal 469 of the exclusive-OR gate 449 is connected to a first, inverting, input terminal 471 of a third AND gate 447 having a second, non-inverting, input terminal 473 connected to the fifth input terminal 344 of the digital logic unit 346. An output terminal 475 of the third AND gate 447 is coupled to the output data bus 244 according to any known method in the art.

The first input terminal 340 of the digital logic unit 346 is connected to the first input terminals 416, 424 of the first and second AND gates 408, 410, respectively, of the first gate circuit 400 and the second input terminal 425 of the second AND gate 409 of the second gate circuit 402. The second input terminal 341 of the digital logic unit 346 is connected to the first input terminals 415, 423 of the first and second AND gates 407, 409, respectively, of the second gate circuit 402, and the second input terminal 462 of the second AND gate 444 of the third gate circuit 404. The third input terminal 342 of the digital logic unit 346 is connected to the third input terminal 426 of the second AND gate 410, the first input terminals 450, 460 of the first and second AND gates 442, 444, and the second input terminal 459 of the second AND gate 445. The fourth input terminal 343 of the digital logic unit 346 is connected to the second input terminal 418 of the first AND gate 408, the third input terminals 419, 427 of the first and second AND gates 407, 409, and the first input terminals 451, 457 of the first and second AND gates 443, 445. The fifth input terminal 344 of the digital logic unit 346 is connected to the second input terminal 417 of the first AND gate 407, and the third input terminals 454, 464 of the first and second AND gates 442, 444. The sixth input terminal 345 of the digital logic unit 346 is connected to the second input terminal 452 of the first AND gate 442, the second input terminal 453 of the first AND gate 443, and the third input terminal 461 of the second AND gate 445.

A truth table (Table 1) corresponding to the third gate circuit 404 is shown below.

TABLE 1

| 341 | 342 | 343 | 344 | 345 | 480 |
|---|---|---|---|---|---|
| 0 | 1 | 1 | 1 | 0 | 1 |
| 1 | 1 | 1 | 1 | 0 | 1 |
| 0 | 1 | 1 | 1 | 1 | 1 |
| 1 | 1 | 1 | 1 | 1 | 1 |
| 0 | 1 | 1 | 0 | 0 | 1 |
| 1 | 1 | 1 | 0 | 0 | 0 |
| 0 | 1 | 1 | 0 | 1 | 1 |
| 1 | 1 | 1 | 0 | 1 | 0 |
| 0 | 0 | 1 | 1 | 0 | 1 |
| 1 | 0 | 1 | 1 | 0 | 1 |
| 0 | 0 | 1 | 1 | 1 | 0 |
| 1 | 0 | 1 | 1 | 1 | 0 |
| 0 | 0 | 1 | 0 | 0 | 1 |
| 1 | 0 | 1 | 0 | 0 | 1 |
| 0 | 0 | 1 | 0 | 1 | 1 |
| 1 | 0 | 1 | 0 | 1 | 1 |
| 0 | 1 | 0 | 1 | 0 | 0 |
| 1 | 1 | 0 | 1 | 0 | 0 |
| 0 | 1 | 0 | 1 | 1 | 0 |
| 1 | 1 | 0 | 1 | 1 | 0 |
| 0 | 1 | 0 | 0 | 0 | 0 |

TABLE 1-continued

| 341 | 342 | 343 | 344 | 345 | 480 |
|---|---|---|---|---|---|
| 1 | 1 | 0 | 0 | 0 | 0 |
| 0 | 1 | 0 | 0 | 1 | 0 |
| 1 | 1 | 0 | 0 | 1 | 0 |
| 0 | 0 | 0 | 1 | 0 | 0 |
| 1 | 0 | 0 | 1 | 0 | 0 |
| 0 | 0 | 0 | 1 | 1 | 0 |
| 1 | 0 | 0 | 1 | 1 | 0 |
| 0 | 0 | 0 | 0 | 0 | 0 |
| 1 | 0 | 0 | 0 | 0 | 0 |
| 0 | 0 | 0 | 0 | 1 | 0 |
| 1 | 0 | 0 | 0 | 1 | 0 |

Given that in some applications, only information relating to a small range of frequencies of the RF input signal 116 is required, the above described AO processor 100 identifies a spatial distribution 109 (FIG. 1) and then identifies the small range of frequencies required; only information relating to the small number of frequencies is multiplexed.

An example of an application where information relating to a small range of frequencies of the RF input signal 116 is required is where the RF input signal 116 is such that, it is desirable only to identify the peak intensity of the spatial distribution 109 corresponding to the RF input signal 116. In this application, the peak intensity of the spatial distribution 109 is known to be located at the center of the spatial distribution 109. Thus, information corresponding other than to the center of the spatial distribution 109 has no information value to the application, and so only serves to reduce the efficiency of the multiplexer unit 208.

Therefore, the AO processor 100 is arranged to identify the spatial distribution 109 and then locate the center of the spatial distribution 109 as this is where the peak intensity of the spatial distribution 109 is known to lie in this particular application.

Operation of the above described apparatus will now be described in the context of the above application where it is desirable to identify a peak intensity 118 of a small spatial distribution 119 (FIG. 1). The small spatial distribution 119 has been selected to illustrate this application in a simple and clear way with respect to the operation of the digital logic unit 346. It should be appreciated that this application is equally applicable to other spatial distributions, such as the spatial distribution 109; the number of levels of logic contained in the digital logic unit 346 simply needs to be increased to cope with the larger number of signals being processed. However, the construction of such "expanded" circuitry based upon the techniques described hereinbelow is within the ability of the skilled person.

Figure 5:
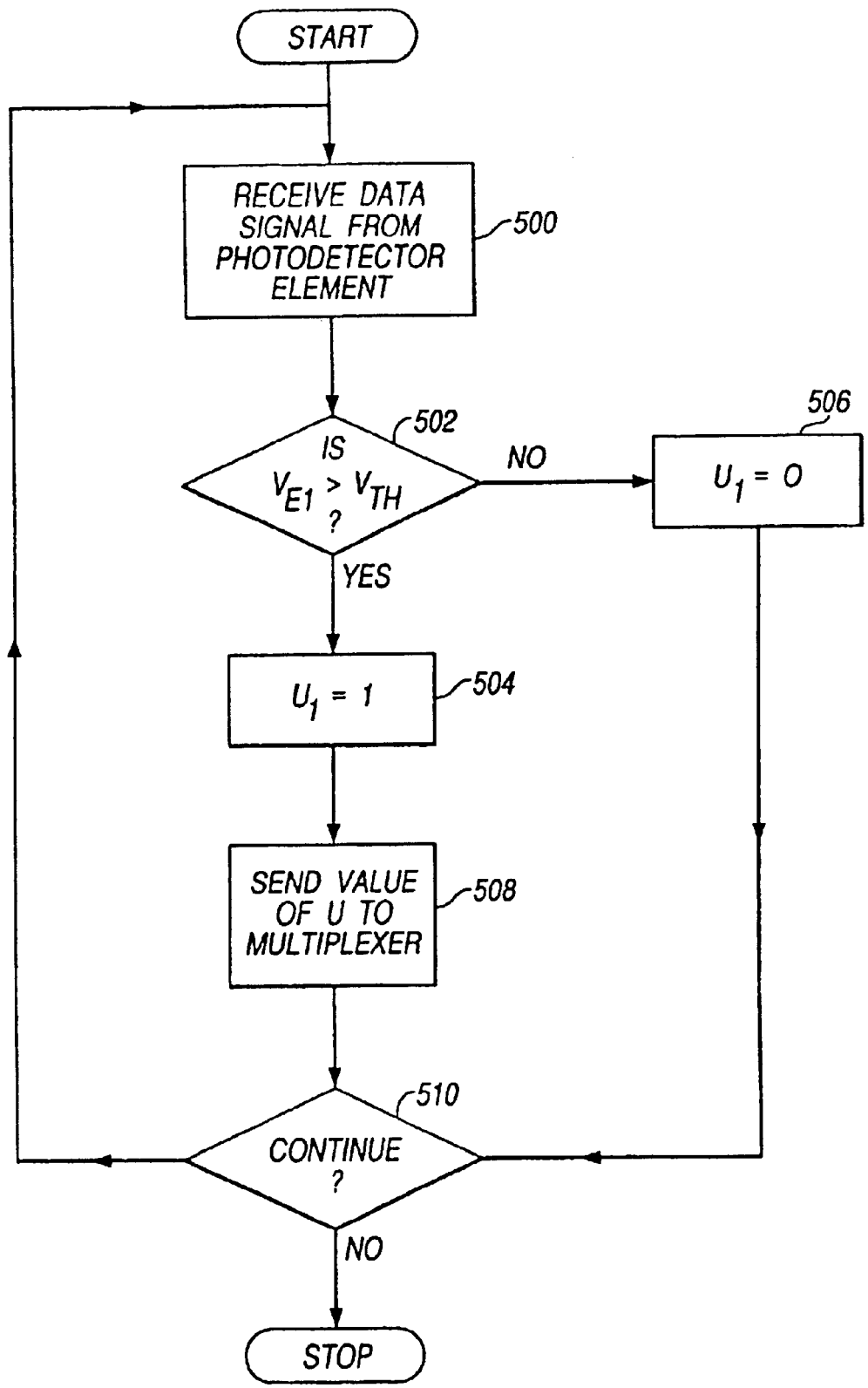
FIG. 5 is a flow diagram of a method for use with the apparatus of FIGS. 2 and 3.

Referring to FIG. 5, the laser 102 generates a beam of coherent light which is collimated by the first lens 104. The collimated light 105 propagates through the Bragg cell 106 which is modulated by acoustic waves (not shown) passing through the Bragg cell 106 to produce spatially modulated light 107. The acoustic waves are generated by the transducer 112, which is supplied with electrical energy from the amplifier 114, the amplifier 114 amplifying the RF input signal 116.

The spatially modulated light 107 propagates through the second lens 108, whereby the small spatial distribution 119 of the propagated light is generated at the focus of the second lens 108, the small spatial distribution 119 corresponding to the temporal spectrum of the RF input signal 116.

As the RF signal 116 varies in time, the temporal distribution at the focus of the second lens 108 varies correspondingly. However, for reasons of clarity and simplicity of description, operation will only be described in relation to the small spatial distribution 119 incident upon the photodiode array 200 at a given instant in time.

The photodiode array 200 located at the focus of the second lens 108 receives light corresponding to the small spatial distribution 119 generated by the second lens 108, and each photodiode converts the photonic energy into electrical energy in the form of a voltage impulse or charge. The voltage impulse generated by each photodiode corresponds to the amount of light incident upon each photodiode. Each photodiode of the photodiode array 200 therefore generates an output signal which is transmitted to each of the input terminals of the input-stage buffer unit 306, in this example, the first, second and $N^{th}$ input terminals 300, 302, 304 (step 500).

The voltage impulse present at the first input terminal 300 of the first input buffer 308 is amplified by the first buffer 308 to produce a pre-amplified signal at the first output terminal 314. The pre-amplified signal is then sampled by the analog multiplexer 208 at the first input terminal 202 and the first input terminal 320 of the comparator unit 326. The pre-amplified signal, present at the first inverting input terminal 320, is compared (step 502) with the first threshold signal $V_{t1}$ of a predetermined threshold value of interest. If the pre-amplified signal, at the inverting input terminal 320 of the comparator 328, is greater than the threshold value $V_{t1}$, the first comparator 328 generates a logical HIGH output signal (step 504), whereas if the pre-amplified signal (at the inverting input terminal 320 of the comparator 328) is lower than the threshold value $V_{t1}$, the first comparator 328 generates a logical LOW output signal (step 506). $V_{t1}$, $V_{t2}$, $V_{tN}$ are set at a low level, for example 4 nV, compared to the pre-amplified signals of interest and sufficiently above any system noise to ensure that noise does not affect processing of the pre-amplified signals. The comparator unit 326 serves to identify the small spatial distribution 119. The logical HIGH or logical LOW output signal is present at the output terminal 334 of the first comparator 328 and is present at the first input terminal 340 of the digital logic unit 346.

The above description relating to the pre-amplification of the voltage impulse present at the first input terminal 308 and the processing of the preamplified voltage impulse by the comparator unit 326 is equally applicable to the voltage impulses generated by other photodiodes in the photodiode array 200. However, it should be appreciated that respective dedicated buffers and comparators will process respective voltage impulses in accordance with the construction of the AO processor 100 already described above.

The digital logic unit 346 then executes the combinatorial and logical process on electrical signals received at the first, second and $N^{th}$ input terminals 340, 342, 344 in conjunction with any data received on the external control bus 348 corresponding to a user's preferences relating to analysis of the RF input signal 116. Thus, in this example, the user wants to select a photodiode corresponding to the center of the small spatial distribution 119 and ignore other pre-amplified signals known to be of no interest when analyzing the RF input signal 116.

It can be seen that, the Fourier transform of a single frequency of the RF input signal 116 will result in a number of adjacent photodetectors of the photodetector array 200 generating voltage impulses in response to light incident thereon. The digital logic unit 346 is arranged to identify the central and therefore the largest of these voltage impulses.

The central voltage impulse corresponding to the peak intensity 118 is identified by detecting edges of the small spatial distribution 119, and performing an "edge erosion" function whereby the edge of the array of signals at the input terminals of the digital logic unit 346 are eroded, or changed to logic LOW signals until a central signal remains. An example of "edge erosion" is shown below, where each row of bits, other than the first row of bits, correspond to the eroding of a pair of edges by the digital logic unit 346 during an iteration of the "edge erosion" function, each bit corresponding to a photodetector element:

001111100
000111000
000010000

However, in other applications the digital logic unit 346 can also be arranged to select pre-amplified signals corresponding to voltage impulses generated by a predetermined number of, for example two, photodiodes located in addition to and adjacent the photodiode responsible for generating the largest of the voltage impulses in order to obtain additional information relating to the temporal behavior of the RF input signal 116.

The voltage impulses or charges generated by each photodiode element are proportional to the intensity of light incident upon the respective photodiode elements. Therefore, photodiode elements upon which the center of the small spatial distribution 119 is incident generate a larger voltage impulse or charge than the photodiode elements upon which other parts of the small spatial distribution 119 are incident.

The voltage impulses or charges are processed in the manner already described above in order to provide respective input signals at the first, second, third, fourth, fifth and sixth input terminals, 340, 341, 342, 343, 344, 345.

The small spatial distribution 119 is incident upon the photodiode array 200 such that the respective input signals present at the first, second, third, fourth, fifth and sixth input terminals, 340, 341, 342, 343, 344, 345 are centered about the fourth input terminal 343. Due to the values of $V_{t1}$, $V_{t2}$, $V_{tN}$, the three photodiodes receiving light of greatest intensity corresponding to the small spatial distribution 119 have been selected by the comparator unit 326, thereby causing the third, fourth and fifth input terminals 342, 343, 344 to receive a logic HIGH input signal. The first, second and sixth input terminals 340, 341, 345 receive logic LOW signals generated by the comparator unit 326, corresponding to photodiodes receiving light in respect of the periphery of the center of the small spatial distribution 119.

The signal at the third input terminal 342 is eliminated or "eroded" by applying the signals present at the second, fourth and fifth input terminals 341, 343, 344 to the first AND gate 407. The signal at the second input terminal 341 is inverted at the input to the first AND gate 407, the first AND gate 407 producing a logic HIGH signal at the output terminal 421 when the signal at the second input terminal 341 is logic LOW and signals at the fourth and fifth input terminals 343, 344 are logic HIGH. A similar operation is performed by the second AND gate 409 by applying the signals present at the first, second and fourth input terminals 340, 341, 343 to yield a signal at output terminal 429. The signals at the output terminals 421, 429 of the first and second AND gates 407, 409 of the second gate circuit 402 are applied to the exclusive-OR gate 413, the exclusive-OR gate 413 generating a logic HIGH signal when only one of the signals at the first and second input terminals 431, 433 is logic HIGH, thereby indicating that the signal at the second input terminal 341 is at the edge of the signals present at the third, fourth and fifth input terminals 342, 343, 344. The signal present at the output terminal 435 of the exclusive-OR gate 413 is inverted at the input terminal 437 of the third AND gate 411, the third AND gate 411 performing a logical AND operation on the signal present at the third input terminal 342 and the input terminal 437, generating a logic LOW output signal at the output terminal 441, thus "eroding" the edge of signals present at the third, fourth and fifth input terminals 342, 343, 344. The fourth logic circuit 406 operates in a similar manner in order to "erode" the edge represented by the signals present at the fifth and sixth input terminals 344, 345. In the case of signals not at the edge of the signals present at the third, fourth and fifth input terminals 342, 343, 344, the third AND gate 446 of the third logic circuit 404 generates a logic HIGH output signal at the output terminal 480, thus leaving the central signal of the signals present at the third, fourth and fifth input terminals 342, 343, 344. In the present example, the third logic circuit 404 has identified (see Table 1 above, the entry for 01110) the signal present at the fourth input terminal 343 as being the central signal, i.e. corresponding to the center of the small spatial distribution 119.

AND gates having four input terminals can be used in place of the first and second AND gates 408, 410, 407, 409, 442, 444, 443, 445; the four-input AND gates can be connected to input terminals corresponding to signals adjacent the signals present at the first and fifth input terminals 340, 344 in order to arrange for three signals rather than one to be selected, for example, for applications where three or more central signals need to be selected.

If the number of logic HIGH input signals representing the small spatial distribution 119 is greater, such as in the case of the spatial distribution 109, further layers of identical logic can be attached to the outputs of the first, second, third and fourth logic circuits 400, 402, 404, 406 in order to further "erode" the edges of input signals of the digital logic unit 346 corresponding to the, larger, spatial distribution 109.

The process executed by the digital logic unit 346 results in the identification of the pre-amplified signals of interest to the user in the form of output data transferred (step 508) to the analogue multiplexer 208 via the output data bus 244. The analog multiplexer 208, based on the output data received from the digital logic unit 346, then samples and multiplexes the pre-amplified signals corresponding to the photodiodes of interest at the full bandwidth of the pre-amplified signals. The multiplexed pre-amplified signals of interest are then switched through to the output buffer unit 222 which is coupled to output pins (not shown) of the integrated circuit. Once the multiplexed pre-amplified signals of interest have been switched through to the output buffer unit 222, the digital logic unit 346 decides whether or not to repeat the above described steps (step 510).

It should be appreciated that operation of the digital logic unit 346 can be facilitated by providing an analog pre-processing stage prior to the digital logic unit 346 to, for example, subtract adjacent signals.

It should be appreciated that the present invention is not limited to the above-described example, and that modifications and/or variations within the scope of the appended claims are conceivable.

What is claimed is:

1. In a data filtering apparatus for a multiplexing unit wherein a radio frequency signal is input to a device that converts said radio frequency signal to a plurality of data signals correlated with the frequencies of the radio frequency signal, and that are detected by a photodiode array, the detected plurality of data signals are output from the photodiode array on a path that inputs the plurality of data signals to the multiplexing unit for processing the improvement comprising:

a) a processing unit, arranged in parallel with the path from the photodiode array to the input to the multiplexing unit, to process the plurality of data signals detected by the photodiode array, b) the processing unit, processing the plurality of data signals to identify at least one data signal conforming to a predetermined criteria, c) the processing unit including a digital logic unit to generate and transmit, an identifying and selective processing signal in response to the identification of the at least one data signal conforming to the predetermined criteria, to the multiplexing unit for controlling the identification and selective processing of the at least one data signal conforming to the predetermined criteria from among the plurality of data input signals being input to the multiplexing unit on the path from the photodiode array to the exclusion of the remaining plurality of data signals not conforming to the predetermined criteria being input to the multiplexing unit on the path from the photodiode array, and d) the processing unit being coupled to the multiplexing unit via an output data bus to transmit the identifying and selective processing signal in response to the identification of the at least one data signal conforming to the predetermined criteria to the multiplexing unit for identification and selective processing of the at least one data signal conforming to the predetermined criteria, e) whereupon the multiplexing unit selectively processes the identified at least one data signal conforming to the predetermined criteria from among the plurality of input data signals being input to the multiplexing unit on the path from the photodiode array to the exclusion of the remaining plurality of data signals not conforming to the predetermined criteria being input to the multiplexing unit from the photodiode array.

2. An apparatus as claimed in claim 1, wherein the processing unit includes a level detector arranged to determine whether each of the plurality of data signals is above a predetermined threshold.

3. An apparatus as claimed in claim 2, wherein the level detector is an array of comparators.

4. An apparatus as claimed in claim 3, wherein the processing unit includes a control bus for inputting an external control signal to the digital logic unit.

5. An apparatus as claimed in claim 2, wherein the processing unit includes a control bus for inputting an external control signal to the digital logic unit.

6. An apparatus as claimed in claim 1, wherein the processing unit includes a control bus for Inputting an external control signal to the digital logic unit.

7. An apparatus as claimed in claim 6, wherein the external control signal is an instruction relating to the selective processing of the plurality of data signals.

8. In a channel selection logic unit for a multiplexing unit wherein a radio frequency signal is input to a device that converts said radio frequency signal to a plurality of data signals correlated with the frequencies of the radio frequency signal, and that are detected by a photodiode array, the plurality of detected data signals are output from the photodiode array on a path that inputs the plurality of data signals to the multiplexing unit for processing the improvement comprising:

a) a processing unit is arranged in parallel with the path from the photodiode to the input to the multiplexing unit, to process the plurality of data signals detected by the photodiode array, b) the processing unit, processing the plurality of data signals to identify at least one data signal conforming to a predetermined criteria, c) the processing unit including a digital logic unit to generate and transmit an identifying and selective processing signal in response to the identification of the at least one data signal conforming to the predetermined criteria to the multiplexing unit for Identification and selective processing of the at least one data signal conforming to the predetermined criteria from among the plurality of data input signals being input to the multiplexing unit on the path from the photodiode array to the exclusion of the remaining plurality of data signals not conforming to the predetermined criteria being input to the multiplexing unit on the path from the photodiode array, and d) the processing unit being coupled to the multiplexing unit via an output data bus to transmit the identifying and selective processing signal in response to the identified at least one data signal conforming to the predetermined criteria to the multiplexing unit for identification and selective processing of the at least one data signal conforming to the predetermined criteria, e) whereupon the multiplexing unit selectively processes the identified at least one data signal conforming to the predetermined criteria from among the plurality of input data signals being input to the multiplexing unit on the path from the photodiode array to the exclusion of the remaining plurality of data signals not conforming to the predetermined criteria being Input to the multiplexing unit on the path from the photodiode array.

9. In a method of filtering a radio frequency signal for a multiplexing unit wherein a radio frequency signal is input to a device that converts said radio frequency signal to a plurality of data signals correlated with the frequencies of the radio frequency signal, and that are detected by a photodiode army, the plurality of data signals detected by the photodiode array being output on a path to the Input of the multiplexing unit for processing the Improvement comprising the steps of:

a) processing in parallel with the path from the photodiode output to the input to the multiplexing unit, the plurality of data signals detected by the photodiode array, b) the processing step, constituting processing the plurality of data signals to identify at least one data signal conforming,to a predetermined criteria.

c) the processing step including generating via a digital logic an identifying and selective processing signal corresponding to the identified at least one data signal conforming to the predetermined criteria, d) transmitting via a data link the identifying and selective processing signal corresponding to the identified at least one data signal conforming to the predetermined criteria to the multiplexing unit for identification and selective processing of the at least one data signal conforming to the predetermined criteria from among the plurality of data input signals being input to the multiplexing unit on the path from the photodiode array to the exclusion of the remaining plurality of data signals not conforming to the predetermined criteria being input on the path to the multiplexing unit from the photodiode array, and e) whereupon the multiplexing unit selectively processes the identified at least one data signal conforming to the predetermined criteria from among the plurality of Input data signals being Input on the path to the multiplexing unit from the photodiode array to the exclusion of the remaining plurality of data signals being input on the path to the multiplexing unit from the photodiode array.

10. A method as claimed in claim 9, further comprising identifying the at least one data signal conforming to the predetermined criteria from the plurality of data signals by determining whether each of the plurality of data signals is above a predetermined threshold.

11. A method as claimed in claim 9, further comprising controlling the digital logic by an external control signal.

12. A method as claimed in claim 11, further comprising the controlling step being effected as an instruction relating to the selective processing of the plurality of data signals.

* * * * *